(No Model.) 6 Sheets—Sheet 1.

R. H. ST. JOHN.
TYPE BAR MACHINE.

No. 442,551. Patented Dec. 9, 1890.

(No Model.)  6 Sheets—Sheet 2.

R. H. ST. JOHN.
TYPE BAR MACHINE.

No. 442,551.  Patented Dec. 9, 1890.

Witnesses
Jos H Blackwood
H E Johnson

Inventor
Roswell H St John
by H T Fisher
Attorney (No Model.) 6 Sheets—Sheet 4.
R. H. ST. JOHN.
TYPE BAR MACHINE.

No. 442,551. Patented Dec. 9, 1890.

Witnesses
Jos. H. Blackwood
H. E. Johnson

Inventor
Roswell H. St John
by H. T. Fisher
Attorney

(No Model.) 6 Sheets—Sheet 5.

R. H. ST. JOHN.
TYPE BAR MACHINE.

No. 442,551. Patented Dec. 9, 1890.

Witnesses
Jos H Blackwood
H E Johnson

Inventor
Roswell H St John
by H T Fisher
Attorney (No Model.) 6 Sheets—Sheet 6.

R. H. ST. JOHN.
TYPE BAR MACHINE.

No. 442,551. Patented Dec. 9, 1890.

Witnesses
Jos H Blackwood
H E Johnson

Inventor
Roswell H St John
by H T Fisher
Attorney

UNITED STATES PATENT OFFICE.

ROSWELL H. ST. JOHN, OF CLEVELAND, OHIO, ASSIGNOR TO THE ST. JOHN TYPOBAR COMPANY, OF SAME PLACE.

TYPE-BAR MACHINE.

SPECIFICATION forming part of Letters Patent No. 412,551, dated December 9, 1890.

Original application filed March 27, 1890, Serial No. 345,466. Divided and this application filed November 13, 1890. Serial No. 371,265. (No model.)

*To all whom it may concern:*

Be it known that I, ROSWELL H. ST. JOHN, a citizen of the United States, residing at Cleveland, in the county of Cuyahoga and State of Ohio, have invented certain new and useful Improvements in Type-Bar Machines; and I do hereby declare that the following is a full, clear, and exact description of the invention, which will enable others skilled in the art to which it appertains to make and use the same.

My invention relates to type-bar machines, and this application is a division of my application, Serial No. 345,466, another division thereof having been patented September 2, 1890, and relating to a composite type-bar as therein claimed.

Referring to the drawings, Fig. 9 shows a plan of the same locking mechanism in the position occupied when a matrix is released to pass forward to the impression box or chamber. Fig. 13 is a section of one of the matrix-rods, showing a lug on the guide-collar which is engaged by the locking-plate. Fig. 17 is an inside view of a section of two sets of matrix-carrying bars like those shown in Figs. 14, 15, and 16, showing at the bottom a slot in which the matrix-bars slide and the matrices grouped in bank, and at the top a similar slot with the matrices cut off and part of the frame broken away to disclose the sleeves on the opposite side and the catches to lock and hold the said sleeves and their rods.

The machine is supported on a suitable frame 10, having a top portion 11, constructed to attach the operating mechanism.

The matrix-carrying frame 12 (shown clearly in Figs. 1, 2, 4, and 7) is built up step by step substantially in the form of a pyramid in cross-section, the two sides of which are formed of matrix-carrying bars with their ends converging and feeding into the matrix-composing chamber 13 at the front of said frame.

Figures 10, 11, 12, 14, 15, 16, 22, 23, 24:
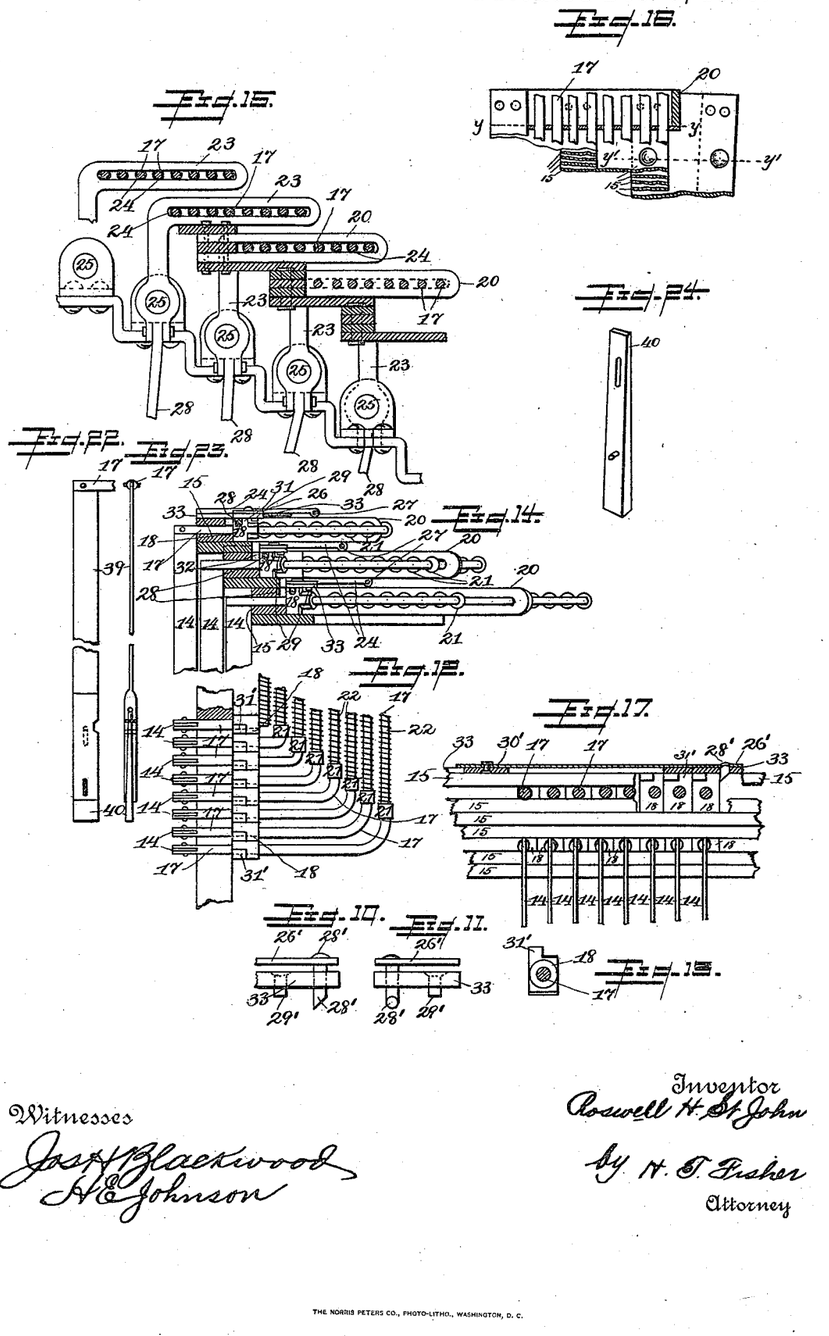
Fig. 10 is a side view of the front end of the adjustable locking-plate shown in Figs. 8 and 9.
Fig. 11 is a front end view.
Fig. 12 is a plan view of a bank of matrices corresponding to the front part of Fig. 8, with the locking mechanism removed and showing the matrix-rods bent substantially at right angles instead of an acute angle, as in Fig. 8. This bending more or less is necessary, according as one position or another is occupied in the pile or pyramid of the matrix-frame, it being further necessary that all the matrices when assembled for an impression shall rest flatly against one another.
Fig. 14 is a view, looking in from the front of the machine, of a section of the matrix-frame taken toward its back end, and showing the relation of each succeeding set of supporting-bars to the set above and below and so arranged that the matrices in the different banks or groups shall have room to pass one another.
Fig. 15 is a view of a cross-section of the rear portion of the machine, the stepped frame and the parts immediately attached thereto being taken on a line back of the matrix part of the frame.
Fig. 16 shows a part plan and a part sectional view of the rear ends of several sets of matrix-carrying bars, each set of bars adapted to carry a single bank of matrices, the relation of said bars being further seen in Fig. 15, and the top portion of the confining-head removed to show the division-plate at its front, through which the matrix-rods pass.
Fig. 22 is a side view, broken in the middle, of a spacing-bar or spacer employed to separate words.
Fig. 23 is an edge view thereof.
Fig. 24 is a perspective view of a wedge used with these spacers to justify and lock the matrices.

Fig. 14 is taken at a point about midway of the length of the matrix-bars and shows the matrices 14 so situated with respect to each other that those in any given bank or set are free to pass those in the adjoining sets. However, when the matrices travel toward the forward end of the frame and reach the point where the carrying-bars 15 on the opposite sides converge, the space between the sets of matrices begins to disappear, and the matrix that has been discharged and may stop part way will be followed and carried forward by the next succeeding matrix sent on its journey to the composing-chamber 13. It is of course not expected that any given matrix will pause thus on its journey, the means by which it is carried forward being designed to be uniform and positive in all parts of the machine and of such strength that the moment the matrix is released it will pass instantly to its place, thus providing for as rapid operation of the machine as is possible mechanically.

Frequently it occurs in machines that the feeding mechanism is neither prompt nor reliable, and that a matrix or type when released may be slow in finding its place, while a succeeding matrix or type may act more promptly and take its position in the holder before the first one gets there, thus causing an error in the printing and much annoyance and delay. In the mechanism herein provided this difficulty is overcome and the matrices fly to their position in the order in which they are released, no difference how rapidly the machine may be operated.

Figure 8:
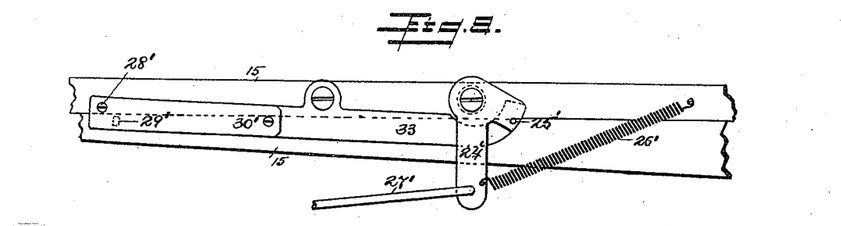
Fig. 8 is a plan view, considerably enlarged, of the central portion of Fig. 7, showing the matrices of a single bank or character grouped and ready for use and a plan of the mechanism used to lock and release said matrices.

The matrix-guiding bars 15 forming frame 12 are spaced in any suitable way to form an open channel or guideway 16 between them. This guideway extends at least the entire distance the matrix is to travel. The edges of bars 15, adapted to any given bank, match evenly their entire length inside, and the matrices or their suspensory pieces lie with their edges against the inside of said bars, one behind the other, as shown in Figs. 8 and 12. Each matrix is fixed on a carrying-rod 17 of sufficient length to operate as herein described. The rods thus arranged are bent at greater or less angle at their front ends, according to their position and relation to the composing-chamber. Thus if they occupy a position at or near the base of the frame, and hence are carried at considerable angle to the said composing-chamber, they will be correspondingly bent at their front ends, so as to feed the matrices into the said chamber side by side with those that come from other portions of the frame. In Fig. 12 it will be seen that the said rods are bent at right angles, showing that these rods occupy a position at about the center or apex of the frame. Therefore the rods in each succeeding bank, beginning at the base and running up on both sides, will be bent somewhat differently from those in the next one above, those occupying corresponding positions upon the respective sides of frame 12 of course being similarly bent.

The rods 17, extending through between the carrying-bars 15, have the matrices fastened firmly thereto at their inner ends and are provided with sleeves, collars, or stops 18, having locking projections or lugs thereon and bearing upon the outer side of said bars, so that while the matrices serve to prevent the said rods from moving one way out of relation to the carrying-bars the said sleeves serve to prevent them moving the other way, and thus the said rods are caused to travel back and forth upon the guide and carrying bars 15 in a proper working position. Each succeeding rod starting with the inner one in each bank is bent with sufficient elbow to clear the preceding one. It will be understood that these banks—shown here as comprising, say, eight matrices—are each of a single character, and as many of such banks are used as there are characters required. These banks should make provision for figures, upper and lower case letters, word-spaces, and the like, and a key-board is fixed on the front of the machine and provided with keys 19, one for each bank, and mechanism extending to the various banks, so that the operator can call in any character he wants.

Figure 1:
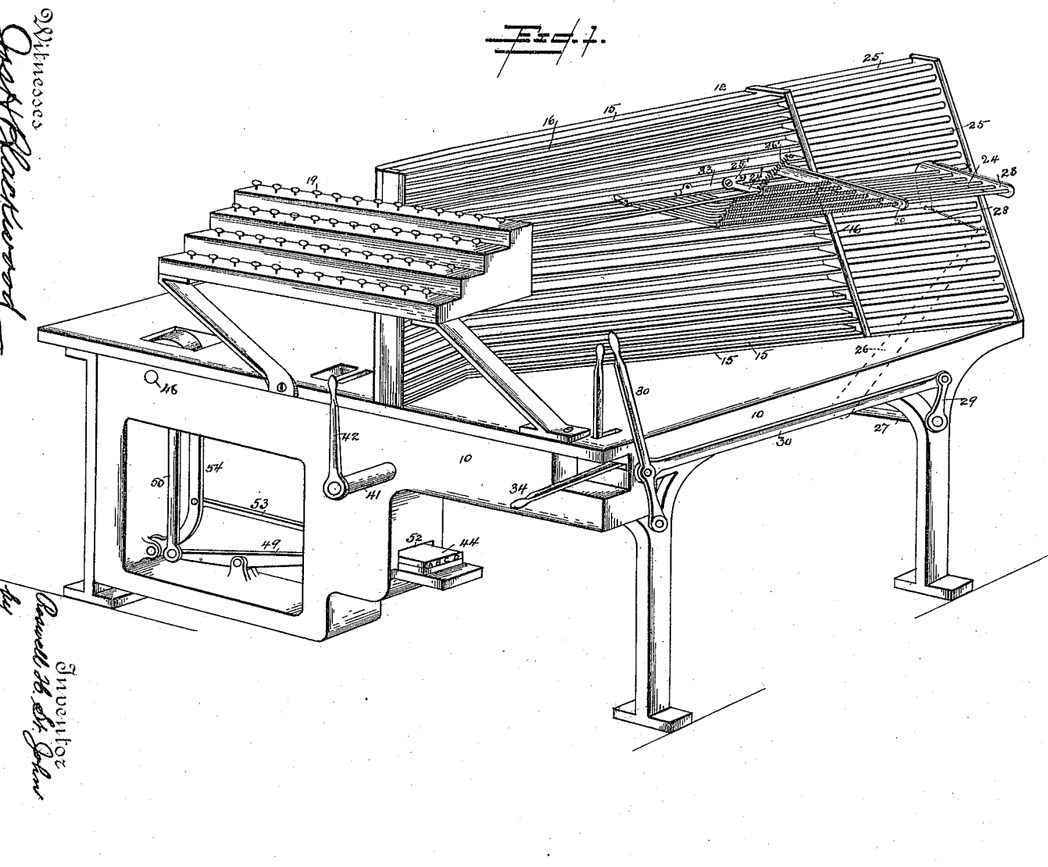
Figure 1 is a perspective view of a machine complete in its frame-work and its operating mechanism and showing one bank of matrix-rods in position thereon to disclose their relation to the matrix guiding and supporting frame and the other parts of the machine.
Figure 2:
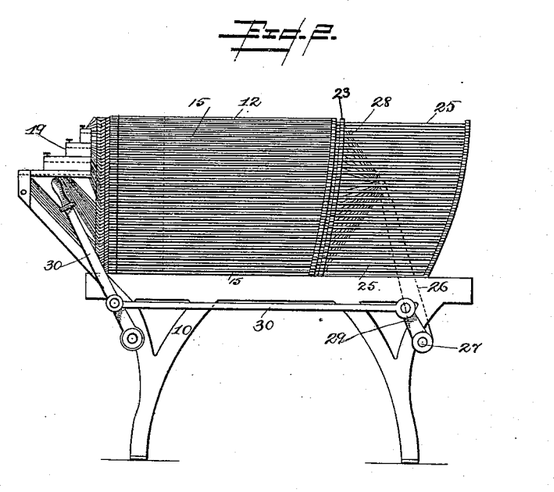
Fig. 2 is a side elevation of my improved machine.
Figure 3:
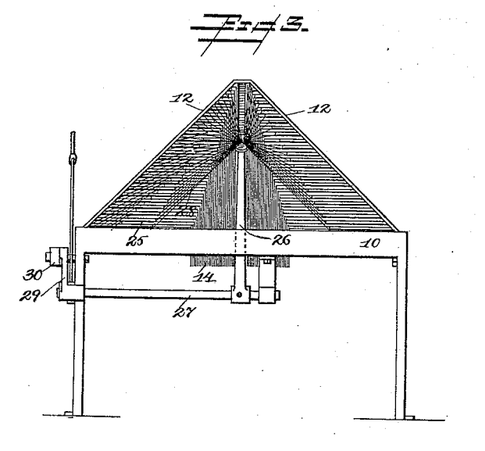
Fig. 3 is a rear elevation with the matrix-carrying bars at one side omitted.
Figure 18:
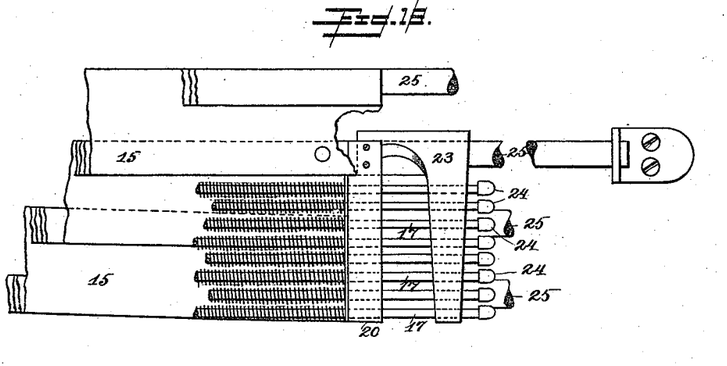
Fig. 18 is a plan view of the rear end of a single set of matrix-carrying bars shown in Figs. 1 and 16 and the fixed head thereon, with the matrix-rods passing through the head, the sliding retracting-yoke, and the fixed rod on which said yoke slides.
Figure 19:
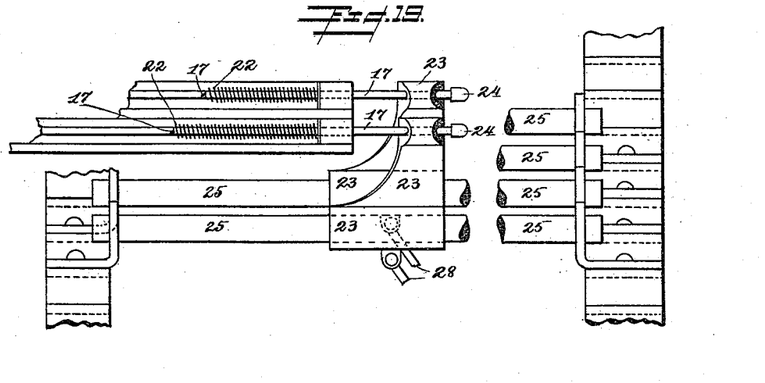
Fig. 19 is a side elevation of Fig. 18, looking from the outside and showing two sets of matrix-rods.

At the rear of each set of bars 15 is a lateral matrix-rod-supporting head 20, Figs. 16 and 18, secured to the frame 12. This head forms a guideway and support for the matrix-rods 17. Intermediate of this head and the sleeve 21 at about the bend of said rod 17 I place a light wire spring 22, designed to have such tension when compressed that it will carry the matrix instantly to working position. Then when a line of matrices has been assembled and used and they are to be distributed to their original positions the distribution is effected by means of a yoke 23, Figs. 1, 15, 18, and 19, engaging the rear ends of the matrix-rods 17, which extend for this purpose beyond the head 20, said rods being provided with small stops 24 at their ends to keep them on the yokes. Each yoke being drawn back upon its supporting-rod 25 returns all the matrices in that bank which have been used. The simultaneous distribution of the matrices thus used in any one impression is effected through arm 26, Figs. 1, 2, and 3, secured to shaft 27 in the rear of the frame. The arm is provided with a ring at its top end and radiating rods 28 connect the said arm with each of the yokes 23. The arm is operated by shaft 27, having a short crank 29, and a link 30, extending to lever 31 at the front of the machine within easy reach of the operator. Thus by a single stroke of the said lever all the matrices used at any one time are distributed, and the machine is ready to form a new line of matter. The rods 25, on which the yokes 23 are adapted to slide, serve to carry the rear ends of the matrix-rods behind the supporting-arms. After each distribution of the matrices all the yokes are again thrown forward, as seen in Fig. 2, so that there will be no obstruction to the assembling of the matrices. The lever 31 and the crank-arm 29 are then in the position shown in Fig. 2.

Each bank of matrices is provided with its own locking mechanism, and this mechanism is connected with the corresponding key on the key-board by which it is moved. When a key is depressed, as in ordinary type-writer work, it will release a single matrix, which will at once fly to its place in the composing-chamber 13. Thus in Figs. 8 and 9 it will be seen that upon the matrix-supporting bars, about midway of their length, is pivoted at 32 a locking-plate 33. At the rear end of this plate is a bell-crank lever 24', likewise pivoted on the matrix-carrying bars, and at the end of its short arm 25' is also pivoted to the bent or curved extremity of the locking-plate 33. Upon the long arm of this bell-crank is a retracting-spring 26', and from this arm extends a rod 27', connected with the corresponding key on the key-board. Thus the said spring serves to hold the locking-plate 33 normally in the position seen in Fig. 8, in which position it confines all the matrices of that bank, as seen in said figure.

On the front end of the locking-plate 33 are two catches 28' and 29'. The catch 28' is beveled upon its front, as shown in Fig. 10, so as to automatically ride over the lugs on the sleeves of the matrix-rods when the said rods are drawn back, and upon its opposite face is constructed to engage said lugs to prevent the matrices from discharging except when required. This catch 28' is fastened to a spring 30' on the locking-plate and passes down through a suitable opening in said plate or at its edge, so as to make the desired engagement beneath. Each of the guide collars or sleeves 18 has an upwardly-projecting lug 31, Figs. 11 and 14, as before described, and it is with this lug that the catch 28' engages when the parts are in the position shown in Fig. 8. The locking-plate 33 has a horizontal movement, the locking end moving inward toward the matrix-carrying bar when the matrix is released, and the said bar may have a notch or opening 32', Fig. 8, in its side to accommodate the catch 28' and permit the sleeved lug on the matrix-rod to pass. When a matrix is thus released, the spring 22 comes into action and sends the matrix to its chamber; but when this occurs the matrices in the bank are held back by the catch 29', located to the rear and at one side of the locking-plate, as seen in Fig. 8, so that when the said plate is moved inward to the position seen in Fig. 9 and a matrix is released the catch 29' interposes in front of the next succeeding rod and engages the lug on its sleeve and prevents its movement. At the moment a matrix is released the finger is lifted from the key, the retracting-spring 26' carries the locking-plate back into the position seen in Fig. 8, and the next succeeding matrix is released from the catch 29' and drops forward to be engaged by the catch 28'. The releasing and locking of the matrices in bank occurs automatically in succession, and the same mechanism and operation occurs in all the banks.

Figures 4, 5, 20, 21, 25, 26:
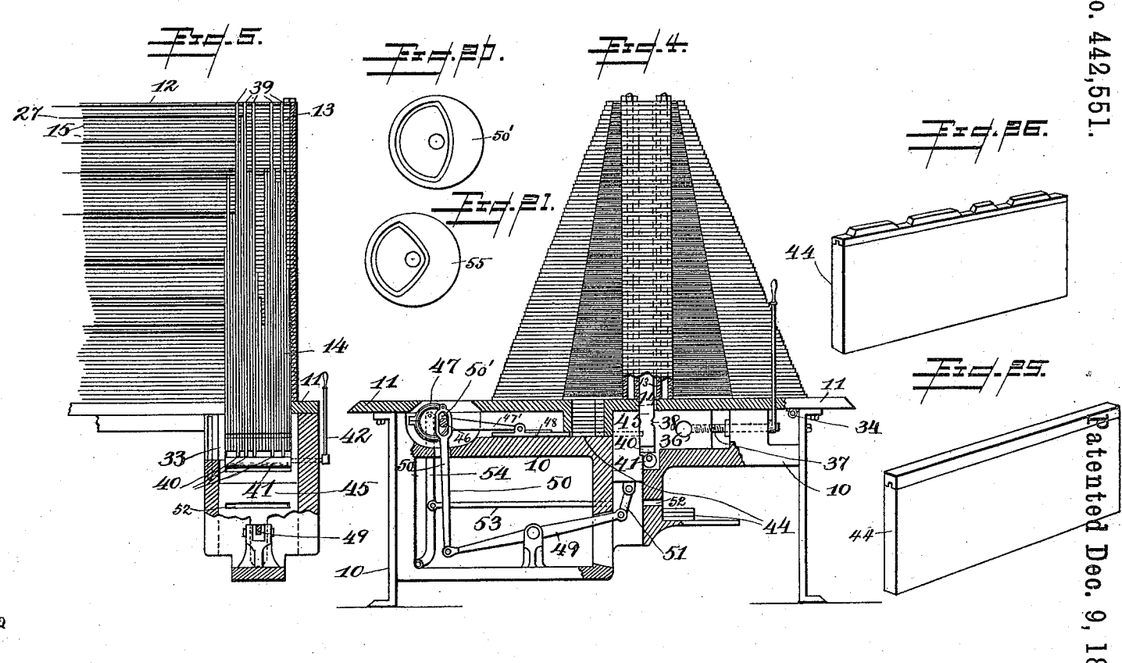
Fig. 4 is a front elevation showing a cross-section of the mechanism for feeding and handling the type-bar blanks and with the key-board removed.
Fig. 5 is a side elevation of the front part of the machine, looking in from the left of Fig. 4, and showing a vertical portion of the type-bar holder, the matrices in position as for an impression, and the type-bar holder down in position to discharge a bar.
Figs. 20 and 21 are side views of different forms of cams employed, as hereinafter described.
Fig. 25 is a view of a type-bar blank with a yielding detachable edge.
Fig. 26 is a view of a bar with characters impressed thereon.
Figure 6:
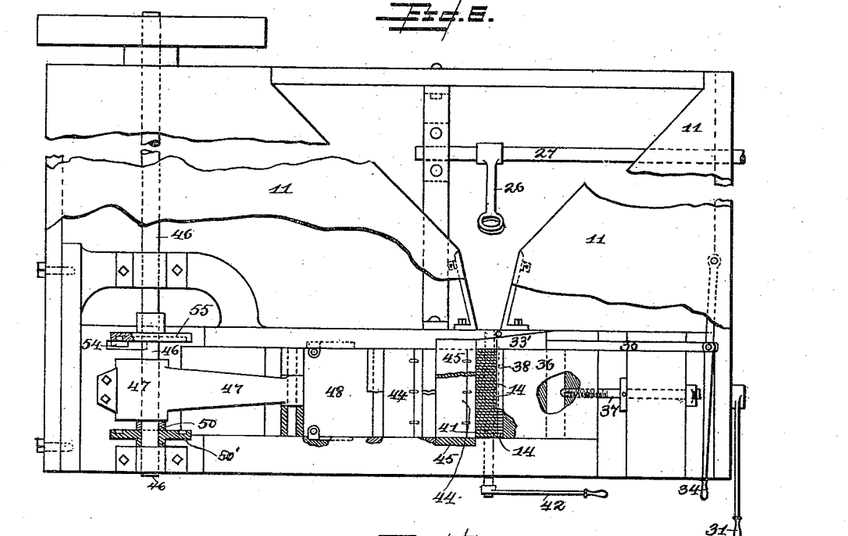
Fig. 6 is an enlarged plan view of the mechanism beneath the bed-plate of the machine, with the frame comprising the matrix-carrying bars and part of the bed-plate removed.
Figure 7:
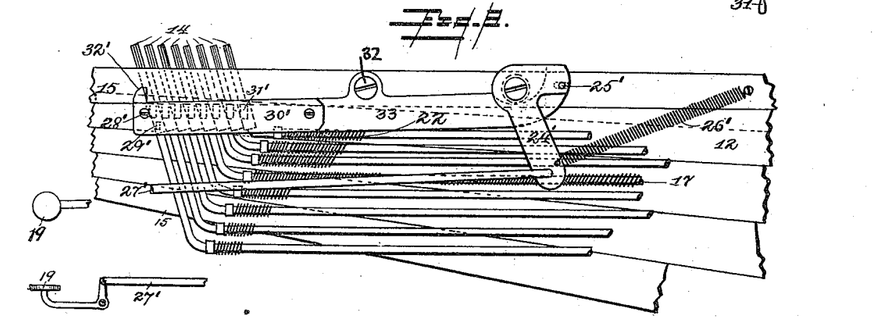
Fig. 7 is an enlarged plan view, partly broken away, of a section of the matrix-carrying frame, and showing a bank of matrices of any given letter, character, or design and the rods connected therewith as they appear when withdrawn and in position to be assembled, one matrix-plate being shown in dotted lines in forward working position.

The chamber 13, Figs. 4, 5, and 7, in which the matrices are assembled for taking an impression, has parallel sides adapted to the width of the matrices, an opening being formed in the table through which the matrices extend partly beneath the table. When assembling is completed to form a line, the next step is to lock the composed form. To do this the wedge 33', Fig. 6, is forced forward against the sides of the matrices and brings them all together side by side. This wedge is here shown as operated by a lever 34 and a stem 35, connecting the lever with the wedge, a suitable bearing being made in the frame of the table for the said wedge. The matrices are next caused to register along their edges and are firmly locked by means of a block 36, Figs. 4 and 6, supported in guideways and provided with a quick-screw 37 or its equivalent to force it into locking position. This block has a beveled tongue 38, which enters a notch in the edge of the matrices and brings them all to a uniform plane and position.

In Figs. 22, 23, and 24 I show the spacing plates or bars 39, designed to separate the words, as ordinarily in printing, and split at their lower ends to accommodate a wedge 40. The wedge and plate thus formed are provided with slots and pins through which they are connected in such manner that the wedge will have sufficient movement to accomplish its purpose and yet not drop below certain limits when not in use. The spaces thus constructed are held in bank upon the main frame at any suitable place the same as the matrices and subject to like mechanism. The locking and the justifying of the form are accomplished by means of these wedges 40, which in their normal condition hang upon their pin-supports in the slots. Then to force them into locking position I employ a cam 41, Figs. 4 and 6, which lies in the bottom of the composing-chamber in suitable bearings. This cam has a lever 42, by which it is turned, and the said wedges are forced into fastening position. The form being thus wedged up is ready to take an impression. This is done by forcing the type-bar blank against the matrices. The box or receptacle holding the type-bar blanks, Fig. 4, is slotted on both sides at its bottom to permit one of the said type-bars 44 to pass. Next I have an adjustable metallic holder 45, supported in guideways in a suitably-constructed frame, shown here as attached to the under side of the table. This holder is adapted to be lifted to a given fixed position at the front of the composing-chamber, and has a transverse slot or opening corresponding to the size of a type-bar blank, which slot when the holder is raised is in exact alignment with the assembled line of matrices and also with the bottom of the box containing the type-bars, so that one of said bars may be forced out of the bottom of the said box or receptacle and through the transverse slot in the holder against the matrices to receive the impression, and thus completely form a type-bar for use. The means for forcing the type-bar blank against the matrices may of course be largely varied; but I show here, Figs. 4 and 6, a shaft 46, carrying cam 47 or a crank, and arm 47', connected with a sliding, pushing, or pressing head 48. After the impression is taken the head 48 is instantly withdrawn and another type-bar blank drops down to the bottom of the supply-box into position to be forced against the matrices by the next movement of the head. The holder 45 is raised and lowered by pivoted lever 49, link 50, and link 51. The link 50 has an oblong slot working on shaft 46, and a lateral pin at its end works in cam 50', fixed on the said shaft, giving the link a limited up-and-down movement.

It is designed that the holder 45 shall register with the matrices, as seen in Fig. 4, and with the slot 52 lower down to discharge the imprinted or finished type-bar, and the foregoing mechanism accomplishes these movements. When the holder 45 is down, a suitable push-bar 53 discharges the type-bar from slot 52 and lodges it on the receiving-shelf. The push-bar 53 is operated by a pivoted lever 54, working in a cam 55 on the shaft 46. The operation of this mechanism is automatic, and each movement will occur in its order and successively as the shaft 46 is turned. Any suitably-formed holder 45 may be used; but when an impression is being taken the sides and ends of the type-bar should be firmly held, so as to avoid upsetting.

I have somewhat particularly described the locking mechanism for securing the matrices in the composing-box; but this, of course, may be widely varied and serve the same purpose, as may also the mechanism for operating the type-bar holder.

The type-bars having the characters impressed in relief thereon are adapted to be set up line by line in lieu of ordinary type, and can be used in connection with ordinary type as such type are used. The characters may be in any style or design that is found useful.

The frame 12, upon which the matrices are carried and guided, is a rigid frame throughout, and is rigidly secured to the base-frame. The general outlines of this frame are clearly shown in the drawings, from which it will be seen that the frame 12 has all its bars 15 converging at the front in two parallel vertical planes, leaving the composing-chamber between to accommodate the matrices, which diverge from this point at different angles to the sides, according as they occupy a higher or lower position in the frame. This gives the frame in cross-section at its center substantially the form of the letter V inverted, thus, $\wedge$, with possibly a little more outward flare at the lower portion of the frame, especially toward its rear extremity. Three parallel bars 15 are here shown as connected, forming a pile, leaving an opening through which the matrix-rods extend into the interior of the frame, the middle bar having a width nearly equal to the other two, as plainly shown in Fig. 14. The outer bars in each series or pile of three form the guideway and support for the front ends of the matrix-rods 17, and have such width that they will hold said bars horizontal. The outer top portion of the middle bar 15 forms a bearing-surface for the collar or sleeve 18 on the rods 17, which assists materially in balancing the said rods in their guide-supports. The idea of this construction is to obtain a wide support for the matrix-rods having parallel upper and lower surfaces, and flat bars are deemed better adapted for this purpose than would be round rods arranged to serve the same purpose. If the parts represented by the bars 15 were made in a single piece, the distinguishing feature of a wide guideway having parallel upper and lower portions would be preserved. It will be noticed that the matrix-rods extend through the frame from the outside thereof and travel back and forth in the bearings between the rods and have the matrices fixed on their inner ends. Each rod carries a separate matrix detachable therefrom by removing the screw by which it is fastened. This provides for interchange of the matrices in case the first in the series become worn while the others (not so much used) remain good. The bars 15 or their equivalent, forming frame 12, are rigid and immovable throughout their length and constitute the permanent frame 12, and differ in this particular from guide-bars adapted to rotate axially to position the matrices, as in some machines relating to this art.

In Fig. 25 I show a type-bar blank as it appears before characters have been formed upon it, and in Fig. 26 the same bar is shown in its finished condition and as it appears after being pressed against the matrices. The blank represents a solid bar, or one made out of material of such solidity that it may be taken substantially in the form shown in Fig. 25 and forced bodily through the holder against the matrices.

The holder 45 is shown and described as a solid holder, and by this is meant a holder made, say, in two pieces united on the line of the slot or opening therein and having the parts firmly united, so as to be in effect the same as if made out of a single piece.

Having thus described my invention, what I claim, and desire to secure by Letters Patent, is—

1. In a type-bar machine, a supporting-frame, a rigid matrix-carrying frame rigidly secured on the supporting-frame and composed of a series of rigidly-fixed horizontal parallel bars or strips, one above the other, and having open spaces horizontally between them, and matrix-supporting rods extending from the outside of said frame through said open spaces and guided by said frame, substantially as set forth.

2. A matrix-supporting frame fixed rigidly on a suitable base and composed of parallel bars or strips rigidly fastened at their ends and separated to form a horizontal space between them, and matrix-rods extending through between said bars or strips and guided thereby, said rods carrying matrices upon their inner ends, substantially as set forth.

3. A matrix-supporting frame composed of a series of permanently-fastened parallel bars or strips, and matrix-rods extending through between said bars or strips and guided thereby, said rods having matrices fixed on their inner ends, and guide-stops bearing against the outside of said bars or strips and secured to said matrix-rods, substantially as set forth.

4. A matrix-frame provided with horizontal guideways to carry the matrix-rods, and a distributing-frame at the rear end of said matrix-frame, composed of horizontal and parallel rods or bars, in combination with matrix-carrying rods extending through the matrix-frame, serving as a guide therefor, and a yoke supported on the distributing-frame to withdraw said rods from assembled position, substantially as set forth.

5. The matrix-carrying frame provided with parallel horizontal openings at intervals between its ends, matrix-supporting rods extending horizontally through said openings from the outside of the frame, and laterally-extending heads supporting said rods in banks at the rear and outside of the frame, substantially as set forth.

6. The matrix-carrying frame provided with lateral heads at its rear end, and matrix-rods supported at their opposite ends in said heads and frame, respectively, in combination with a rear frame having distributing-yokes, through which the matrix-rods extend, substantially as set forth.

7. The matrix-frame provided with lateral supports at its rear and matrix-carrying rods extending through said frame and back and through said supports, in combination with a rear frame composed of parallel rods or bars, and yokes supported thereon and having the matrix-carrying rods extending through the same and free to slide therein, substantially as set forth.

8. The matrix-frame having parallel horizontal openings between its ends, through which the matrix-rods extend, and lateral heads at its rear, in which the said rods are adapted to slide, in combination with said rods, a rear frame, yokes on said rear frame, through which the matrix-rods project, and mechanism to operate said yokes back and forth, substantially as set forth.

9. The matrix-carrying frame and lateral rod-supports at the rear end of the frame, matrix-rods extending from the outside to the inside of the said frame at their front ends and through the lateral supports at their rear ends, springs on said rods to feed them forward, and a lock to hold the rods in bank, substantially as set forth.

10. The matrix-frame composed of fixed parallel flat bars or strips having horizontal openings between them, a frame at the rear of the matrix-frame, consisting of parallel rods or bars, and outwardly-extending yokes free to slide on the said rods or bars, in combination with matrix-rods extending through said yokes at their rear ends and through said horizontal openings in the matrix-frame at their front ends, and a spring on each of said rods to carry it forward into the composing-space when released, substantially as set forth.

11. The matrix-frame having lateral matrix-rod supports on its outside at the rear end, and the yoke-carrying frame provided with yokes free to slide back and forth thereon, in combination with matrix-rods extending loosely through said yokes and through the lateral rod-supports and through the matrix-frame, and a spring on each of said rods between their front ends and said rod-supports, substantially as set forth.

12. In a type-bar machine, the matrix-carrying frame and the distributing-frame at the rear thereof provided with horizontal sliding yokes, in combination with matrix-rods extending through said yokes and through said matrix-frame, a pivoted arm, and connecting-rods between said arm and each of said yokes, whereby the yokes are simultanneously operated, substantially as set forth.

13. A matrix-frame and the extension-frame at the rear thereof carrying sliding yokes, in combination with matrix-rods extending at their front ends through the matrix-frame and through the said yokes at their rear ends, and having stops bearing against the back of said yokes, substantially as set forth.

14. The matrix-frame composed of rigid bars and the matrix-rods extending through said frame from the outside thereof and having the matrices fixed rigidly to their inner ends, and a sleeve or collar bearing against the outside of the matrix-frame and secured to said matrix-rod, substantially as set forth.

15. The matrix-frame composed of rigid bars and the matrix-rods extending laterally through said frame and provided with guide sleeves or collars having projections at the outside of the frame, and a locking-catch to engage said projections, substantially as set forth.

16. The matrix-frame and the matrix-rods outside thereof, bent substantially at right angles at their front ends and extending through said frame, and guide-collars on the rods at the outside of the frame, substantially as set forth.

17. The matrix-frame, the matrix-rods bent substantially at right angles near their front ends and extending through the said frame, and bearings on the rods at the outside of the frame between the frame and the angle of bend in the said rods, substantially as set forth.

18. The matrix-frame having lateral rod-supports at its rear, the matrix-rods extending through said matrix-frame and bent substantially at right angles thereto and resting in said lateral rod-supports and in the matrix-frame, and having stops at the angle of the bends, and springs on the rods between said stops and the said lateral rod-supports, substantially as set forth.

19. The matrix-frame having sides converging from the bottom to the top of the frame and composed of parallel flat strips or bars having horizontal openings between them, a series of matrix-rods extending through the frame, one behind the other, and having their ends bent at substantially right angles at different lengths, and matrices fixed on the inner extremities of said rods, substantially as set forth.

20. The matrix-frame, the extension-frame provided with yokes adapted to slide thereon, matrix-rods supported in said yokes and extending through the matrix-frame, in combination with a rock-shaft and an arm rigid therewith, and rods connecting the arm and each of said yokes, whereby the yokes are operated back and forth on their supports, substantially as set forth.

21. The matrix-frame composed of rigid bars and the matrix-rods outside thereof and projecting through the sides of the frame into the same, matrices on the inner ends of the rods bearing against the inside of the frame, and projections on the rods at the outside of the frame, in combination with a pivoted locking-catch to engage said projections, substantially as set forth.

22. The matrix-frame composed of rigid bars and the matrix-rods outside thereof and extending into the same and guided thereby, said rods having projections fixed thereon immediately outside of the frame, in combination with a pivoted piece having a catch to engage said projections, substantially as set forth.

23. The matrix-frame composed of rigid bars, the matrix-rods extending through said frame and having a sleeve or collar at the outer side of the frame provided with a projection, and a matrix on the inside of the frame, in combination with a pivoted plate having a catch projecting from its under side to engage the said projection, substantially as set forth.

24. The matrix-frame and a locking-plate pivoted on said frame and having a spring with a catch extending beneath the plate, in combination with a matrix-rod extending through the frame and having a projection outside thereof engaged by said spring-catch, substantially as set forth.

25. The matrix-frame and the matrix-rod extending through the frame and having a collar at the outside of said frame, in combination with a horizontally-pivoted plate provided with a fixed catch on its bottom, and a spring with a catch extending beneath said plate, substantially as set forth.

26. The matrix-frame and the matrix-rod having a projection fixed thereon at the outside of the said frame, in combination with a pivoted plate provided with two separate catches, one of which is at the rear of the other and to one side thereof and the other of which is secured to a spring, substantially as set forth.

27. The matrix-frame and the matrix-rod having a collar with a lug on top, in combination with a horizontally-pivoted plate having a spring provided with a catch extending through said plate and having its outside beveled inwardly and its locking side straight, and a separate catch fixed on said plate laterally and back of the spring-catch, substantially as set forth.

28. The matrix-frame and the matrix-rods having projecting lugs fixed thereon at the frame, in combination with a pivoted plate provided with two different catches to engage said lugs successively, one of said catches provided with a spring, a lever to operate said plate, a connection between said lever and an operating-key, and a retracting spring, substantially as set forth.

29. The matrix-frame composed of rigid bars and the matrix-rods supported on said frame, projections on said rods outside the frame at the side thereof, and springs on the rods to carry them forward, in combination with a pivoted piece having two separate catches to engage said projections alternately, and a key and connections extending therefrom to the said pivoted piece, whereby it is operated to release and hold the matrices successively, substantially as set forth.

30. The matrix-frame and the matrix-rods having projections to be engaged by a lock and springs to force the rods forward, in combination with a locking-plate having two separate catches, a bell-crank lever to operate said plate, a key, a rod between the key and bell-crank lever to operate said lever, and a retracting-spring, substantially as set forth.

31. The matrix-frame, a series of matrix-rods bent at an angle and extending through the same, a lock constructed to release one rod at a time, and mechanism connected with each rod to force it forward when released, in combination with a distributing-yoke at the rear of the matrix-frame engaging the ends of said rods, whereby all the released rods are carried back at one time, substantially as set forth.

32. The composing-chamber, matrices assembled and secured in a fixed line, the blank-holder at one side of said chamber, said holder formed in a solid block and having an opening through from side to side and inclosing the blank at its sides and ends, in combination with a pressure device to press the blank in said opening against the assembled matrices, and mechanism to move the holder to discharge the type-bar, substantially as set forth.

33. The composing-chamber, the blank-holder having a transverse opening opposite said chamber to inclose the blank at its sides and ends, a pressure device to force the blank through the holder against the matrices and compress the characters on the edge of the type-bar, and mechanism by which the type-bar is moved from the holder, substantially as set forth.

34. The composing-chamber, the blank-holder having an opening therethrough inclosing the blank on its sides and ends and located in front of said chamber, and guides between which the holder is adapted to be raised and lowered, in combination with a pressure device to force the blank through the holder against the assembled matrices, and a pivoted lever connected with the said holder to raise and lower the same, substantially as set forth.

35. The main frame and the matrix-frame composed of rigid bars and provided with a composing-chamber, and a chamber for the blank-holder at the front of the composing-chamber, in combination with a vertically-movable blank-holder having a transverse slot, and a pressure device to force the blank through the holder against the matrices, substantially as set forth.

36. In a type-bar machine, matrices assembled and secured in a fixed line, a holder having an opening inclosing the blank on its sides and ends, and a pressure device to force the blank through the holder against said matrices, substantially as set forth.

37. In a type-bar machine, a line of assembled matrices, a holder having an opening tightly inclosing the blank at its sides and ends to prevent upsetting, and a pressure device to force the blank through the holder against the said matrices, substantially as set forth.

38. In a type-bar machine, a matrix-assembling chamber, matrices and spaces in said chamber, and an eccentric in the bottom of the chamber and acting directly on the justifying-wedges of the spaces, substantially as set forth.

39. In a type-bar machine, a base-frame, a matrix-carrying frame rigidly secured thereon and composed of horizontal parallel flat strips or bars with parallel openings lengthwise between them, forming guideways for the matrix rods, said matrix-frame substantially in the shape of an inverted V in cross-section and its sides converging toward the front end, and matrix-rods extending through said frame, substantially as set forth.

40. In a type-bar machine, a line of assembled matrices, a blank-holder having a transverse opening at the front of said matrices, a receptacle for holding the blanks, and a device to force one blank at a time through said holder against the matrices, substantially as set forth.

41. The main frame having a line of assembled matrices, a blank-holder having a transverse opening, and a receptacle opposite said holder having an opening in its bottom to pass a blank to form the finished type-bar, in combination with a pressure device to press the blank from the receptacle through the said holder, substantially as set forth.

42. In a type-bar machine, the spaces having split ends, and wedges suspended in said ends and having limited movement therein, in combination with an eccentric acting directly on the wedges, substantially as set forth.

43. In a type-bar machine, the spaces split at their ends, the wedges in said ends, and slots and pins in said parts to limit the movement of the wedges, substantially as set forth.

44. In a type-bar machine, the spaces having wedges suspended in their lower ends, in combination with a composing-chamber having a rotating cam in its bottom to bear directly against said wedges, substantially as set forth.

45. In a type-bar machine, a base-frame and a matrix carrying and guiding frame fixed rigidly on the base-frame and composed of parallel bars or rods firmly united at their ends and constructed to form an open guideway between their opposed sides, the matrix-rods extending through said guideway and bearing against the upper and lower surfaces thereof, and a lateral support at the rear of said frame for the matrix-rods, substantially as set forth.

46. In a type-bar machine, a base-frame and a matrix-carrying frame fixed rigidly to the base-frame and consisting of a series of fixed superposed strips or bars having parallel flat sides, said strips or bars separated between their ends to form open guideways between them for the matrix-rods, in combination with matrix-rods extending through said guideways and provided with removable matrix-plates at the ends, substantially as set forth.

47. In a type-bar machine, a matrix-frame composed of a series of rigidly-fastened bars or strips arranged to form a frame substantially in the shape of an inverted letter V in cross-section at the center, in combination with matrix-rods extending through said frame from the outside and having matrix-plates attached to their inner ends, the plates in each bank arranged in different vertical planes from the others, substantially as set forth.

48. In a type-bar machine, a matrix-chamber having an assembled series of matrix-plates therein with characters in their front edges, and a blank-holder, having an opening therethrough and located in the front of said chamber in contact with the matrix-plates, in combination with mechanism to lock the matrix-plates, a blank in the said holder, and a pressure device to bear against the blank and force it bodily through the holder against the matrices, substantially as set forth.

Witness my hand to the foregoing specification this 3d day of November, 1890.

ROSWELL H. ST. JOHN.

Witnesses:
H. T. FISHER,
NELLIE S. McLANE.